United States Patent
Wang

(10) Patent No.: US 8,259,446 B2
(45) Date of Patent: Sep. 4, 2012

(54) LATCHING ASSEMBLY AND ELECTRONIC DEVICE USING THE SAME

(75) Inventor: Peng Wang, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 263 days.

(21) Appl. No.: 12/871,922

(22) Filed: Aug. 31, 2010

(65) Prior Publication Data

US 2012/0008260 A1    Jan. 12, 2012

(51) Int. Cl.
    *G06F 1/16* (2006.01)
(52) U.S. Cl. .................................................. 361/679.58
(58) Field of Classification Search .............. 361/679.58
    See application file for complete search history.

(56) References Cited

U.S. PATENT DOCUMENTS

| | | | | |
|---|---|---|---|---|
| 5,917,696 A | * | 6/1999 | Peng | 361/679.33 |
| 5,967,633 A | * | 10/1999 | Jung | 312/223.2 |
| 6,134,116 A | * | 10/2000 | Hoss et al. | 361/747 |
| 6,354,680 B1 | * | 3/2002 | Lin et al. | 312/223.2 |
| 6,362,975 B1 | * | 3/2002 | Liu et al. | 361/796 |
| 6,373,692 B1 | * | 4/2002 | Cheng | 361/679.59 |
| 6,711,009 B2 | * | 3/2004 | Lee et al. | 361/679.58 |
| 6,795,307 B2 | * | 9/2004 | Arbogast et al. | 361/679.58 |
| 6,819,551 B2 | * | 11/2004 | Chen | 361/679.02 |
| 7,061,755 B2 | * | 6/2006 | Lin et al. | 361/679.58 |
| 7,420,812 B2 | * | 9/2008 | Chen et al. | 361/724 |
| 7,483,264 B2 | * | 1/2009 | Chen et al. | 361/679.57 |
| 7,758,133 B2 | * | 7/2010 | Chen et al. | 312/223.2 |
| 8,077,470 B2 | * | 12/2011 | Zhang et al. | 361/747 |
| 2006/0007649 A1 | * | 1/2006 | Yang | 361/683 |

* cited by examiner

*Primary Examiner* — Lisa Lea Edmonds
(74) *Attorney, Agent, or Firm* — Altis Law Group, Inc.

(57) ABSTRACT

An electronic device is provided. The electronic device includes a first casing, a second casing, and at least one latching assembly. The second casing defines a through hole. Each latching assembly includes an operating member, a latching block, and at least one positioning member. The operating member includes a first plate and a second plate secured to the first plate. The first plate extends through the through hole, the second plate is external to the through hole. The latching block protrudes from the first casing. When the second plate is driven to move from the first position to the second position, the first plate engages the latching block and the positioning member to secure the second casing to the first casing. When the second casing is driven to move from the second position to the first position, the first plate disengages from the latching block and the positioning member.

12 Claims, 6 Drawing Sheets

LATCHING ASSEMBLY AND ELECTRONIC DEVICE USING THE SAME

BACKGROUND

1. Technical Field

The present disclosure relates to latching assemblies and electronic devices and, particularly, to a latching assembly without screws and an electronic device having the latching assembly.

2. Description of Related Art

Conventional designs of computer system housings provide a product that is difficult to quickly open, and requires the manufacturer or the user to unfasten and then refasten the fasteners using tools. After repeated openings and closings, the computer case may be damaged.

BRIEF DESCRIPTION OF THE DRAWINGS

The components of the drawings are not necessarily drawn to scale, the emphasis instead being placed upon clearly illustrating the principles of a latching assembly and an electronic device using the same. Moreover, in the drawings, like reference numerals designate corresponding parts throughout several views.

DETAILED DESCRIPTION

Figure 1:
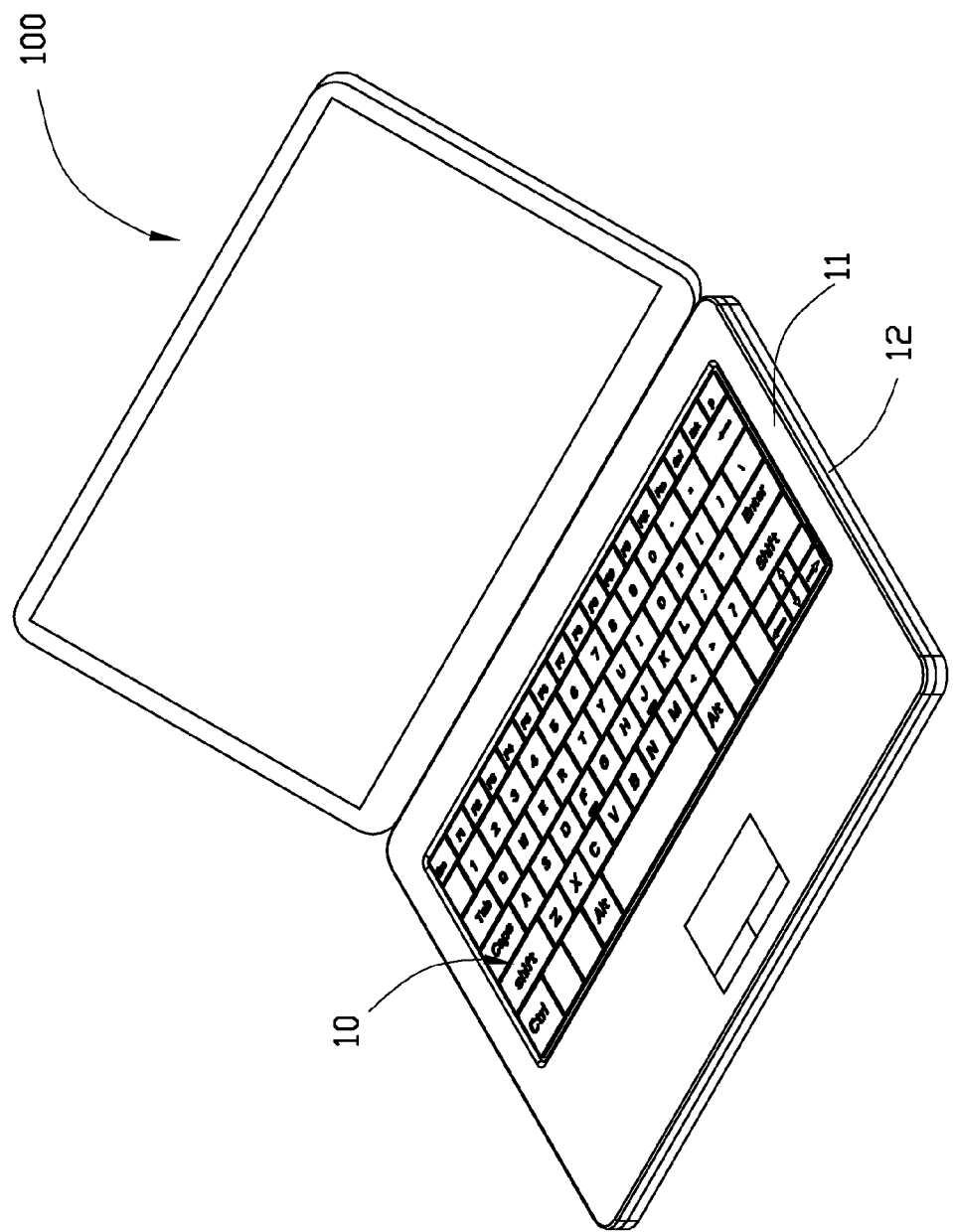
FIG. 1 is an isometric view of an electronic device in accordance with an exemplary embodiment.
Figure 2:
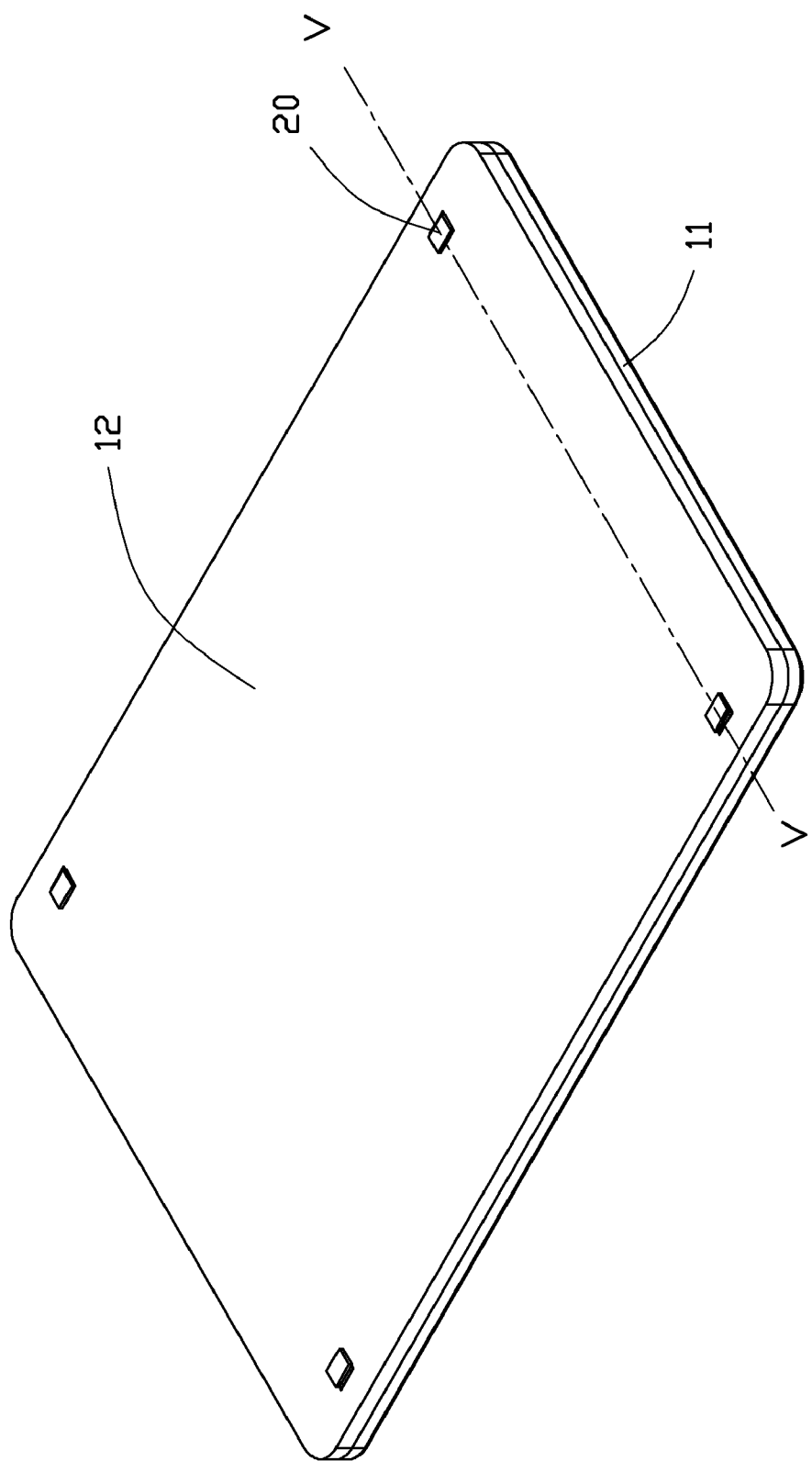
FIG. 2 is another isometric view of the electronic device of FIG. 1, showing a bottom of the electronic device.

Referring to FIGS. 1-2, an electronic device 100 in accordance with an exemplary embodiment is shown. In the embodiment, the electronic device 100 is a notebook computer. The electronic device 100 includes a housing 10 and a number of latching assemblies 20. The housing 10 includes a first casing 11 and a second casing 12. The latching assemblies 20 are configured to detachably secure the first casing 11 to the second casing 12. In the embodiment, there are four latching assemblies 20, arranged adjacent to the four corners of the housing 10. The number and the arrangement of the latching assemblies 20 can vary according to need.

Figure 3:
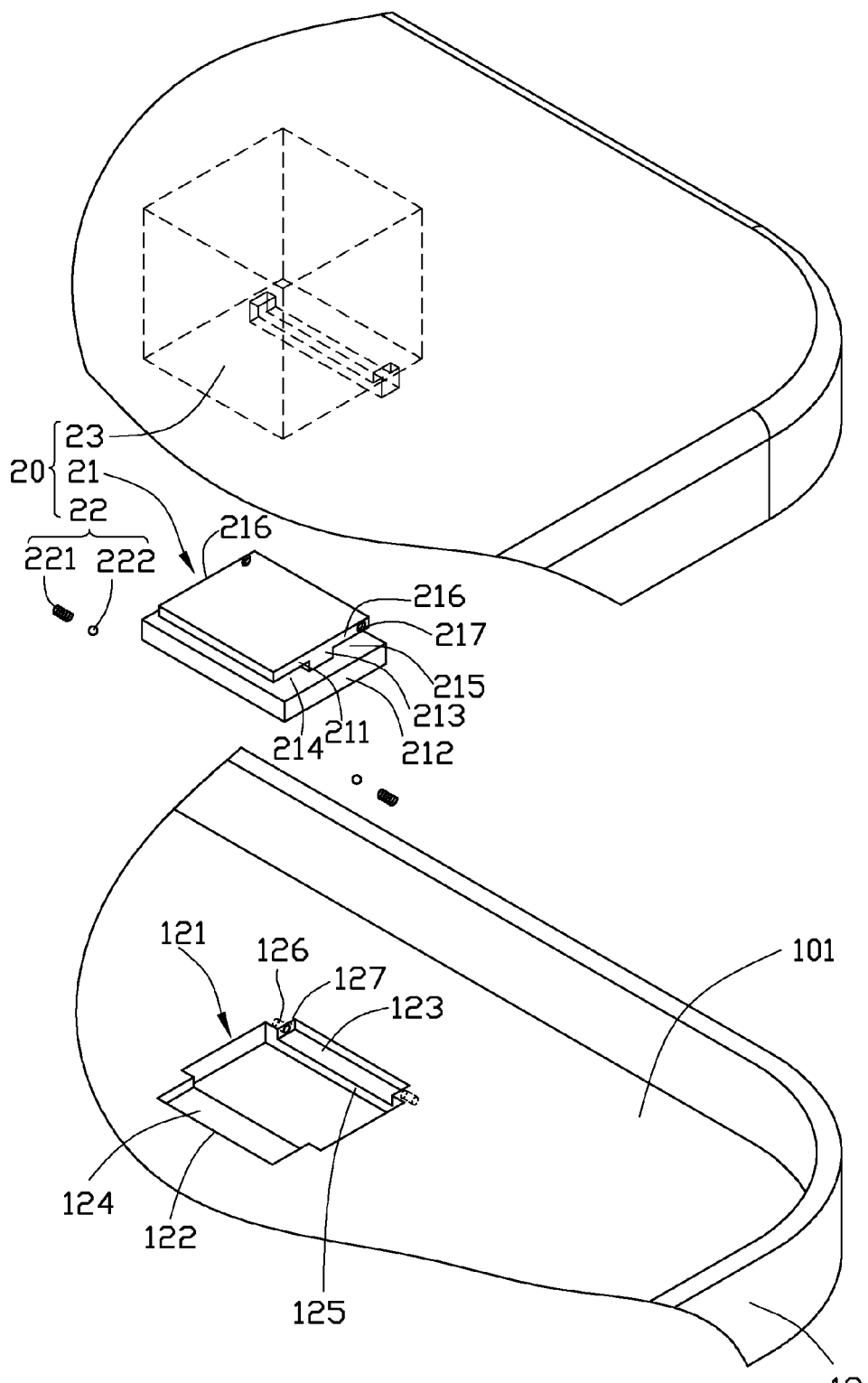
FIG. 3 is a partial, exploded view of the electronic device of FIG. 1, showing a latching assembly of the electronic device.
Figure 4:
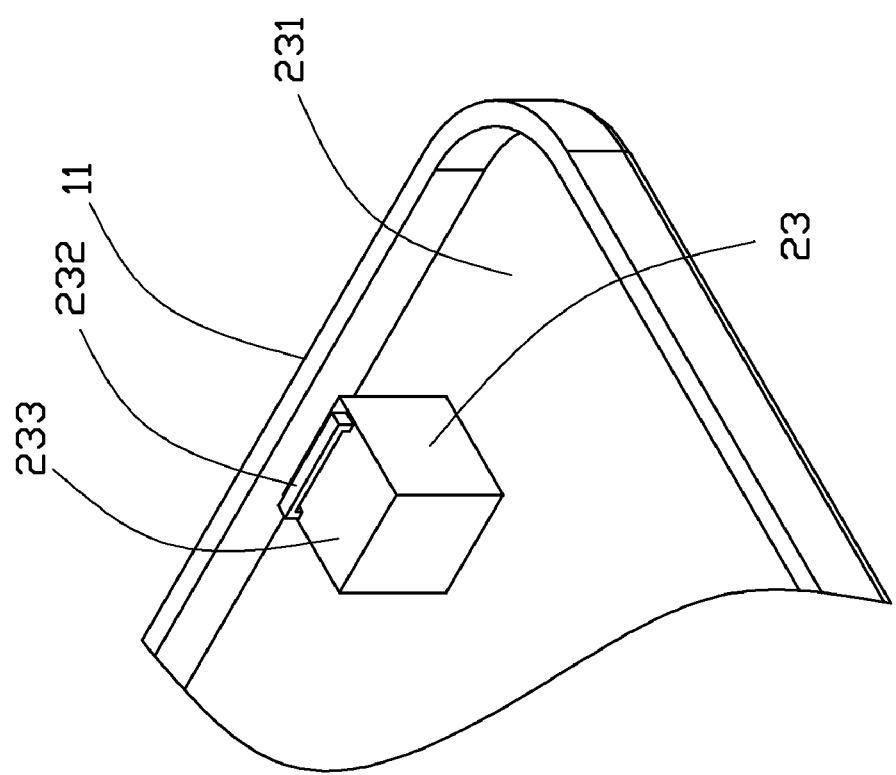
FIG. 4 is a partial, exploded view of a first casing of the electronic device of FIG. 3.
Figure 5:
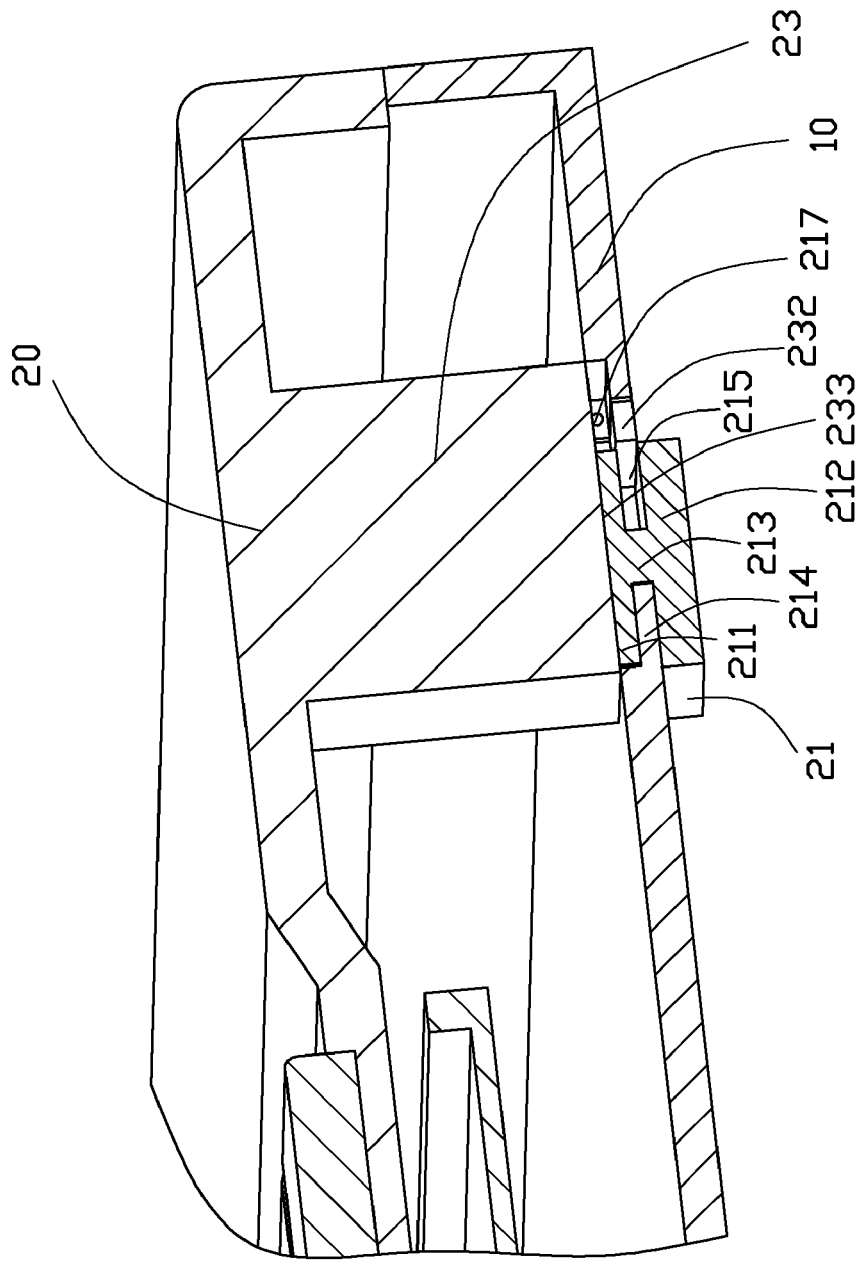
FIG. 5 is a partial, cross-sectional view taken along line V-V of FIG. 2, showing the electronic device in an unlocked state.

Referring to FIGS. 3-5, the bottom of the second casing 12 defines a through hole 121. A first recessed portion 122 and a second recessed portion 123 are formed in the bottom of the second casing 12 and are spaced by and communicate with the through hole 121. The first recessed portion 122 includes a bottom 124. The second recessed portion 123 includes a bottom 125 and two opposite sidewalls 126. The bottom 124 of the first recessed portion 122 is wider than the bottom 125 of the second recessed portion 123. Each sidewall 126 defines a first positioning hole 127.

Each latching assembly 20 includes an operating member 21, two positioning members 22, and a latching block 23. The operating member 21 includes a first plate 211, a second plate 212, and a bar 213. The bar 213 protrudes from a bottom of the first plate 211 and substantially perpendicularly connects the first plate 211 to the second plate 212. The first plate 211, the second plate 212, and the bar 213 cooperatively define a first gap 214 and a second gap 215 to respectively receive the bottom 124 of the first recessed portion 122 and the bottom 125 of the second recessed portion 123. The first plate 211 includes two opposite sidewalls 216. The sidewalls 216 respectively define second positioning holes 217 able to receive a part of the positioning member 22. In the embodiment, the second plate 212 is wider than the first plate 211, and the size of the through hole 121 is slightly greater than that of the first plate 211 and smaller than that of the second plate 212. The first plate 211 can be extended through the through hole 121 and can be received in the second casing 12, and the second plate 212 is external to the second casing 12 for a user to operate.

Each positioning member 22 includes an elastic member 221 and a resisting member 222. One end of each elastic member 221 is fixed in each first positioning hole 127, and the opposite end is fixed to one resisting member 222. Each resisting member 222 can be received in one second positioning hole 217. The distance between the resisting members 222 is slightly less than that between the sidewalls 216. In one embodiment, the elastic members 221 are coil springs, and the resisting members 222 are balls.

The latching block 23 protrudes from the bottom 231 of the first casing 11. A handle 232 protrudes from the top 233 of the latching block 23. The handle 232 and the top 233 cooperatively define a slot 234. The first plate 211 can pass through the slot 234.

To secure the second casing 12 to the first casing 11, the second casing 12 is placed on the first casing 11, causing the handle 232 to be received in the through hole 121 adjacent to the second recessed portion 123, and substantially parallel to the bottom 125 of the second recessed portion 123. The operating member 21 extends through the through hole 121 to a first position, causing the second plate 212 to be external to the through hole 121. The first plate 211 is received in the through hole 121 and opposes the top 233 of the latching block 23, and the bottom 124 is received in the first gap 214. At this point, the second plate 212 is pushed away from the first recessed portion 122, causing a portion of the first plate 211 to pass through the slot 234 and the bottom 125 of the second recessed portion 123 to be received in the second gap 215. The second plate 212 is then further pushed away from the first recessed portion 122, causing the first plate 211 to resist the resisting members 222, and causing the elastic members 221 to be distorted. As the second plate 211 is moved to a second position where each resisting member 222 is aligned with one second positioning hole 217, the elastic members 221 rebound to cause the resisting members 222 to be respectively received in the second positioning holes 217. At this point, the second casing 12 is secured to the first casing 11.

Figure 6:
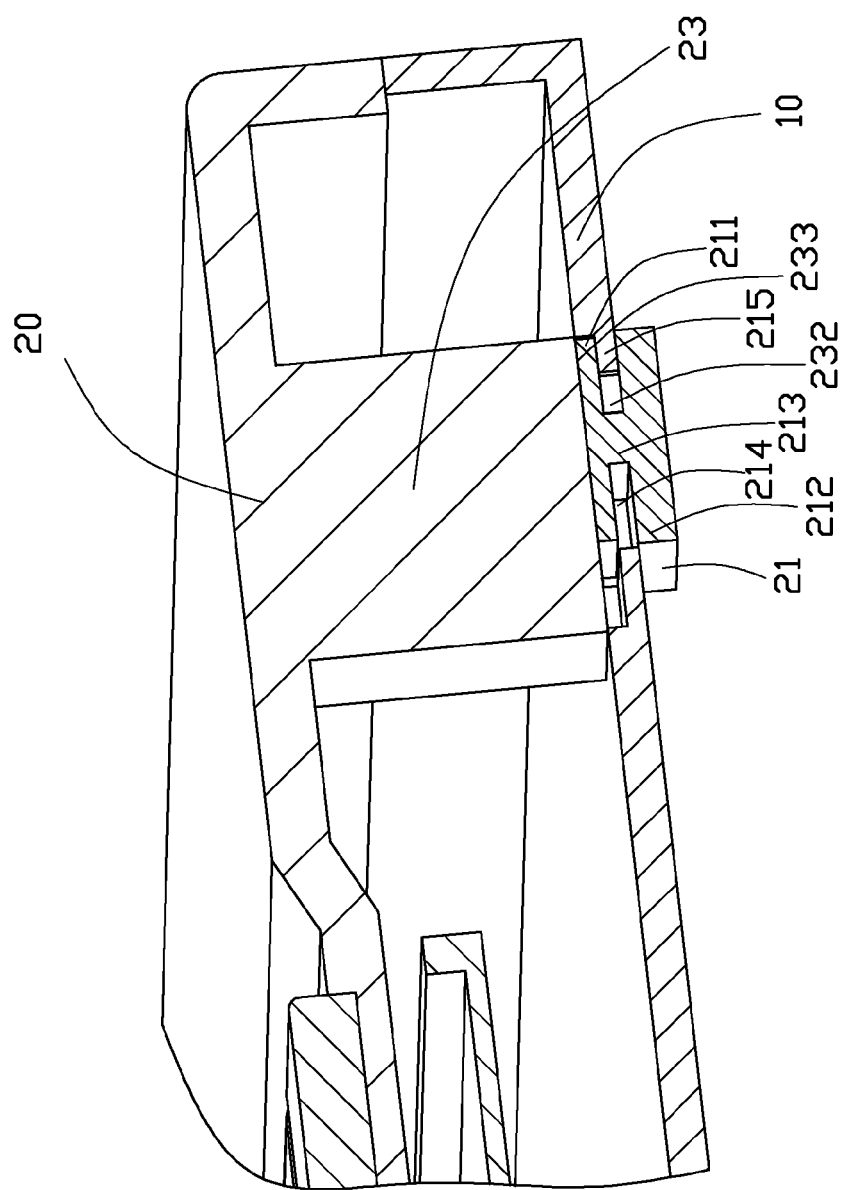
FIG. 6 is similar to FIG. 5, but showing the electronic device in a locked state.

Referring to FIG. 6, to remove the second casing 12 from the first casing 11, the second plate 212 is pushed toward the first recessed portion 122 until each resisting member 222 moves out of the second positioning hole 217. The second plate 212 is then further pushed toward the first recessed portion 122 to be in the first position, causing the bottom 125 of the second recessed portion 123 to disengage from the second gap 215, and the first plate 211 to disengage from the slot 234. At this point, the second casing 12 can be removed from the first casing 11.

Although the present disclosure has been specifically described on the basis of the exemplary embodiment thereof, the disclosure is not to be construed as being limited thereto.

Various changes or modifications may be made to the embodiment without departing from the scope and spirit of the disclosure.

What is claimed is:

1. A latching assembly applied in an electronic device, the electronic device comprising a first casing and a second casing, the second casing defining a through hole, the latching assembly comprising:

an operating member comprising a first plate and a second plate secured to the first plate, the first plate being received in the second casing, the second plate being external to the second casing for a user to operate on the second plate to drive the first plate to move from a first position to a second position;

a latching block protruding from the first casing; and at least one positioning member mounted in the second casing;

wherein, when the second plate is driven to move from the first position to a second position, the first plate engages the latching block and the at least one positioning member to secure the second casing to the first casing; when the second casing is driven to move from the second position to the first position, the first plate disengages from the latching block and the at least one positioning member.

2. The latching assembly as described in claim 1, wherein a handle protrudes from the latching block, a portion of the first plate is capable of extending through the handle.

3. The latching assembly as described in claim 2, wherein the handle and the latching block cooperatively define a slot, the first plate capable of extending through the slot.

4. The latching assembly as described in claim 1, wherein the first plate defines at least one positioning hole, each of the at least one positioning member comprises an elastic member and a resisting member, one end of each of the at least one elastic member is fixed in the second casing, an opposite end of the at least one elastic member is secured to one of the at least one resisting member, when the first plate is driven to move to the second position, each of the at least one resisting member is received in one of the at least one positioning hole.

5. The latching assembly as described in claim 4, wherein each of the at least one elastic member is a coil spring, each of the at least one resisting member is a ball.

6. An electronic device, comprising:

a first casing;

a second casing defining a through hole; and at least one latching assembly, each of the at least one latching assembly comprising:

an operating member comprising a first plate and a second plate secured to the first plate, the first plate extending through the through hole, the second plate being external to the through hole for a user to operate on the second plate to drive the first plate to move from a first position to a second position;

a latching block protruding from the first casing; and at least one positioning member mounted in the second casing;

wherein, when the second plate is driven to move from the first position to the second position, the first plate engages the latching block and the at least one positioning member to secure the second casing to the first casing; when the second casing is driven to move from the second position to the first position, the first plate disengages from the latching block and the at least one positioning member.

7. The electronic device as described in claim 6, wherein a handle protrudes from the latching block, a portion of the first plate is capable of extending through the handle.

8. The electronic device as described in claim 7, wherein the handle and the latching block cooperatively define a slot, the first plate capable of extending through the slot.

9. The electronic device as described in claim 6, wherein the first plate defines at least one positioning hole, each of the at least one positioning member comprises an elastic member and a resisting member, one end of each of the at least one elastic member is fixed in the second casing, an opposite end of the at least one elastic member is secured to one of the at least one resisting member, when the first plate is driven to move to the second position, each of the at least one resisting member is received in one of the at least one positioning hole.

10. The electronic device as described in claim 9, wherein each of the at least one elastic member is a coil spring, each of the at least one resisting member is a ball.

11. The electronic device as described in claim 6, wherein the operating member further comprises a bar, the first plate, the second plate, and the bar define a first gap and a second gap, the second casing defines a first recessed portion and a second recessed portion, the first recessed portion and the second recessed portion are spaced by and communicate with the through hole, the bottom of the first recessed portion and the bottom of the second recessed portion, when the operating member is at the first position, the bottom of the first recessed portion is received in the first gap, the bottom of the second recessed portion disengages the second gap, when the operating member is at the second position, the bottom of the first recessed portion is received in the first gap, the bottom of the second recessed portion is received in the second gap.

12. The electronic device as described in claim 11, wherein the bottom of the first recessed portion is width than the bottom of the second recessed portion.

* * * * *